UNITED STATES PATENT OFFICE.

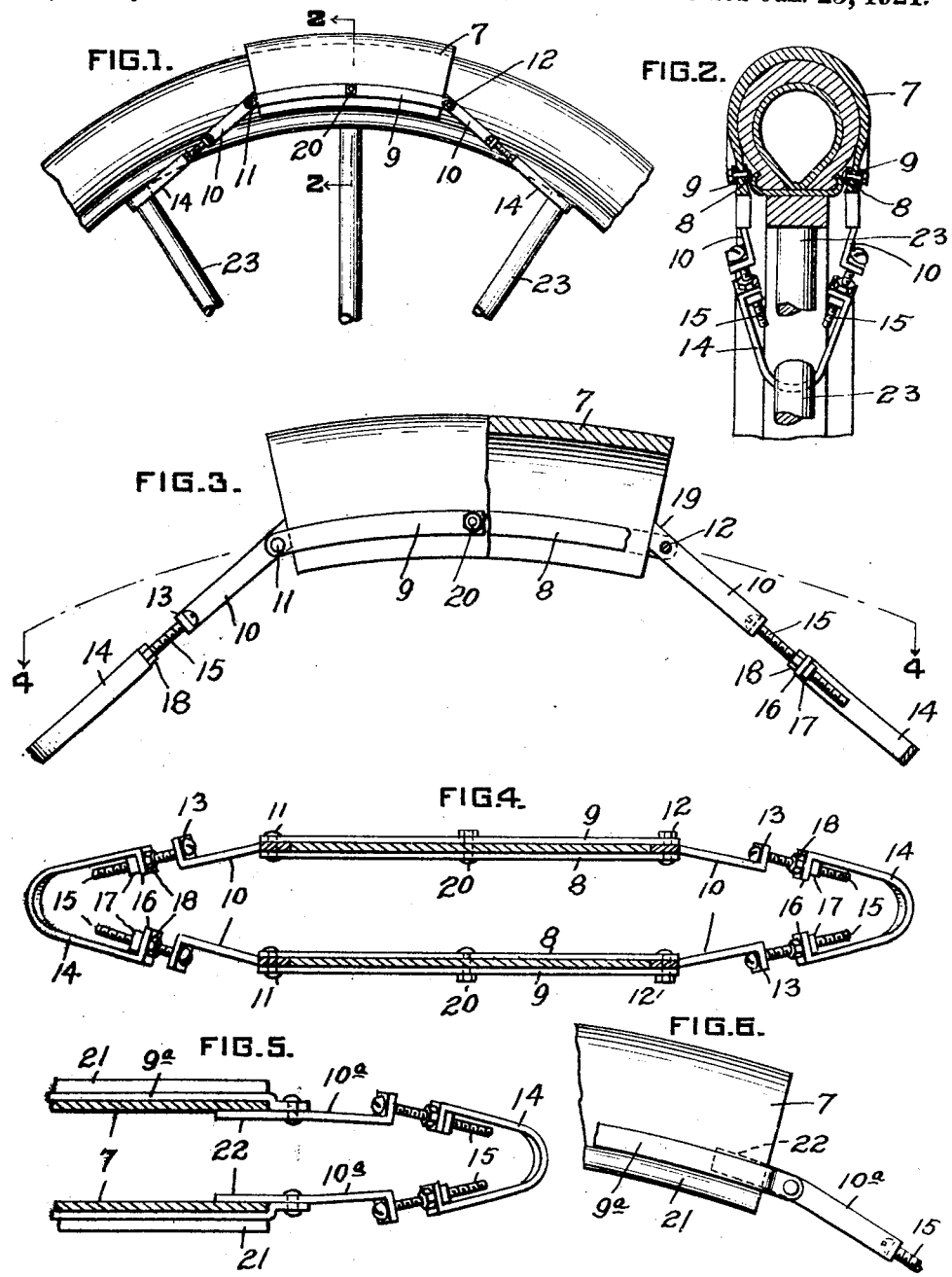

ALEXANDER M. CLARK, OF KNOXVILLE BOROUGH, PENNSYLVANIA.

BLOW-OUT-CLOSURE DEVICE OR PATCH FOR PNEUMATIC TIRES.

1,366,358.     Specification of Letters Patent.     Patented Jan. 25, 1921.

Application filed February 11, 1918. Serial No. 216,487.

*To all whom it may concern:*

Be it known that I, ALEXANDER M. CLARK, a citizen of the United States, and a resident of the borough of Knoxville, in the county of Allegheny and State of Pennsylvania, have made a new and useful Invention in Blow-Out-Closure Devices or Patches for Pneumatic Tires, of which the following is a specification.

This invention relates to blow-out closure devices or patches for pneumatic tires, and an object thereof is to provide in combination with a section of an old tire shoe, screw operated means capable of exerting longitudinal as well as radial pull on said tire section whereby the same may be securely held in contact with the tire and endwise slippage thereof prevented.

A further object is to provide a simple relatively cheap and efficient blow-out closure patch and clamping means for the same.

These, as well as other objects which will readily appear to those skilled in this art, I attain by means of the device described in the specification and illustrated in the drawings accompanying the same and forming a part of this application.

In the drawings (throughout which similar elements are denoted by like characteristics) Figure 1 is a fragmentary view in side elevation of a pneumatically tired wheel with a device embodying this invention shown in place thereon, Fig. 2 is a cross sectional view of said wheel and device, Fig. 3 is an enlarged view of said device shown partially in section and partially in side elevation, Fig. 4 is a view of said device with the the shoe shown in section and is taken looking downwardly on line 4—4, Fig. 3 and Fig. 5 is a section similar to Fig. 4 but through one end only of a modified form of the invention. Fig. 6 is a side elevation of one end only of the device as modified in Fig. 5.

In making up the device of this invention a section 7 of a tire shoe of suitable length is utilized and this, it will be understood may either be a section of a beaded shoe or a section of a straight side shoe as shown in Fig. 2. The modified form of clamp shown in Figs. 5 and 6 is adapted for use with beaded or clencher type shoe sections.

The lower edge of each side of the shoe or patch section is confined and stiffened by means of a stiffening member made up of metal straps 8 and 9 preferably bent to conform to the radius of the wheel. As shown in Figs. 1 to 4, inclusive, these straps extend from end to end of the patch and sufficiently far enough beyond the ends to provide room for bolts or rivets. A link 10 is pivotally secured to each end of each stiffening member between the strap pieces 8 and 9, being connected to the member at one end by means of a rivet 11 and at the other end by means of a bolt 12. Bolt 12 is used in place of a rivet so that it may be removed to allow the stiffening member to be slipped in place lengthwise over the patch section. The links are preferably made from strap metal and their inner ends 13 are bent at right angles to the body portion thereof and provided with screw holes.

A saddle member 14 bent so as to embrace one of the spokes 15 of the wheel has each of its ends connected to one of the links by means of a screw 15. The ends 16 of the saddle are bent at right angles and are punched to receive the screw. On opposite sides of the bent end or head 16 a nut is placed. By turning the screws 15 through nuts 17 the saddle will be drawn toward the patch. Nuts 18 are utilized as lock nuts when the proper tension has been secured.

The inner end 19 of each link is mitered so that when the device is in place the ends of the links abut against the ends of the patch section.

For the purpose of insuring a tight grip between the straps 8 and 9 and the shoe a bolt 20 is passed through the center of members 8 and 9 and the side wall of the patch.

In the modification shown in Figs. 5 and 6 the link 10ª does not abut the end of the shoe 7 as the link 10 in the principal form. Instead, it passes inside of the shoe for a short distance and there ends. The strap 9ª. corresponding to strap 9 in the principal form, is crimped at the end of the shoe to engage the latter and then secured to link 10ª. With this form, links 10ª for both ends of the patch may be riveted, so that the links pivotally connect with the member 9ª. By turning the links to an unusual position the patch may be put in place and when the links are again turned to normal position the patch will be securely locked in place.

In applying this device to a cut or blowout, the patch section will be placed thereover and each saddle 14 will be placed so as to embrace a spoke of the wheel adjacent thereto. Screws 15 will then be tightened until the proper tension is placed on the patch. This will preferably be done when the tire is partially deflated. After the patch is in place and the proper tension obtained by means of the screws the tire may be inflated, and, on account of the endwise pull as well as the radial pull exerted on the patch the same will be securely held in contact with the tire shoe and endwise movement thereof or creeping prevented.

It will be understood that various modifications of the construction shown may be made without departing from the spirit of this invention.

Having thus described my invention what I claim is—

1. In a blow-out closure device for pneumatic tires and in combination with a pneumatic tire and a spoked wheel carrying the same, a shoe section embracing said tire, a pair of metallic stiffening means embracing each longitudinal edge of said shoe section and extending beyond the end of the shoe, a spoke engaging device secured to each end of each of said pairs of metallic means and extending away from the shoe in opposite directions.

2. In a blow-out closure device for pneumatic tires and in combination with a pneumatic tire and a spoked wheel carrying the same, a shoe section embracing said tire, metallic means extending lengthwise of said shoe section and lying on opposite sides of each longitudinal edge thereof, a spoke embracing device secured to each end of said means and extending away from said shoe section in opposite directions.

In testimony whereof, I have hereunto subscribed my name this 2nd day of February, 1918.

ALEXANDER M. CLARK.